Patented Jan. 7, 1941

2,227,546

UNITED STATES PATENT OFFICE 2,227,546

POLYAZO DYESTUFFS AND THEIR MANUFACTURE

Adolf Krebser, Riehen, near Basel, Switzerland, assignor to the firm of J. R. Geigy A. G., Basel, Switzerland No Drawing. Application September 6, 1938, Serial No. 228,646. In Switzerland September 7, 1937

6 Claims. (Cl. 260—173)

This invention relates to the manufacture of substantive polyazo dyestuffs, and aims to produce new dyestuffs having valuable properties and being capable of producing fast blue to grey shades on cotton and viscose which may be developed on the fibres to fast green shades.

It has previously been proposed in the U. S. Patents 2,074,225 and 2,128,188 to produce o-hydroxy azo-dyestuffs, capable of being chromed, for wool, from diazotized o-aminophenols and the N-acyl and N-aryl or N-alkyl derivatives of the otherwise technically unused 2-amino-6-hydroxy-naphthalene-8-sulphonic acid.

According to the present invention 2-aroyl-amino-6-hydroxynaphthalene-8-sulphonic acids or their derivatives, substituted in the aroyl radical, are used for the production of substantive polyazo dyestuffs of the general formula

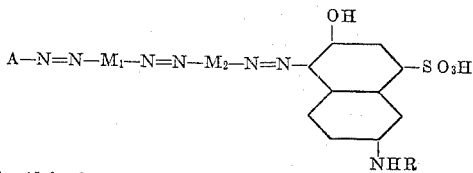

In this formula:—

A represents the radical of a benzene or naphthalene sulphonic or carboxylic acid, M₁ and M₂ represent the radicals of two amines of the benzene and naphthalene series capable of being coupled in the para position, and R represents an unsubstituted or substituted, particularly an amino substituted, aroyl radical.

Substantive dyestuffs of the benzidine and thiazol series with 2-amino-6-hydroxynaphthalene-8-sulphonic acid as azo components have already been described (P. Ruggli, Helv. Chim. Acta XIII, 756), but in consequent of their unsatisfactory qualities of fastness they are technically entirely valueless.

Example 1

17.3 parts of aniline-m-sulphonic acid are diazotized and coupled in the known manner with 24.5 parts of Cleve's 1-amino-naphthalene-7-sulphonic acid. Further diazotizing is effected, the diazo body is isolated and coupled in weak mineral acid solution with 16 parts of amino hydroquinone dimethyl ether. After completion of the coupling further diazotizing is effected, the new diazo compound is separated by salt and filtered off. The press cakes are formed into a paste with water and coupled at 0° C. with a solution, prepared from 400 parts of water and 30 parts of 20% ammonia, of 36 parts of 2-(4'-amino)-benzoylamino-6-hydroxynaphthalene-8-sulphonic acid.

After the combination has been completed the bronzing dyestuff is filtered off and dried. It dissolves in water greenish-blue, in concentrated sulphuric acid bluish-grey shades. By development on the fibres with phenyl-methyl pyrazolone there are obtained fast yellowish-green shades.

A similar dyestuff is obtained by the use of the 2-(3'-amino)benzoyl-6-hydroxynaphthalene-8-sulphonic acid. As middle components there may also be used amino hydroquinone diethyl or dibenzyl ether, cresidine, amino naphthal ethers, α-naphthylamine or the like. The dyestuffs obtained possess similar properties.

Example 2

28 parts of 1-amino-4-acetyl amino naphthalene-7-sulphonic acid are diazotized as usual and coupled in the known manner with 24.5 parts of Cleve's 1-amino naphthalene-6-sulphonic acid. Further diazotizing is effected, the diazonium compound is isolated and coupled in acetic solution with 22 parts of Cleve's 1-amino naphthalene-7-sulphonic acid. The amino disazo dyestuff obtained is dissolved as soda salt, 6.5 parts of nitrite are added and the whole is made Congo acid with hydrochloric acid. When the diazotizing has been completed the diazonium compound is allowed to flow into a soda alkaline solution of 32 parts of 2-benzoylamino-6-hydroxynaphthalene-8-sulphonic acid. The coupling is completed in a short time, the dyestuff is precipitated completely with a little cooking salt, filtered and dried. It constitutes a dark powder which dissolves greenish-blue in water, greyish-blue in concentrated sulphuric acid and dyes cotton and viscose in fast bluish-grey shades.

Instead of the two Cleve acids as middle components there may also be used the compounds of Example 1 used at these places or the modifications enumerated there can be gone through. Instead of the initial components set out in the above examples there may also be used others such as for example the following:

Aniline-o-sulphonic acid, aniline-2:5-disulphonic acid, 4-chloraniline-3-sulphonic acid, 2-naphthylamine-4:8-disulphonic acid. The dye-stuffs obtained have similar properties.

What I claim is:

1. Substantive polyazo dyestuffs of the general formula

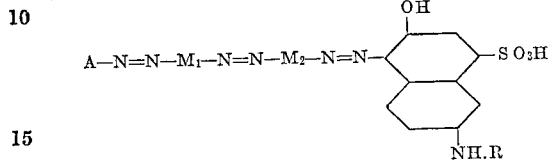

wherein

A represents an acid radical of the benzene and naphthalene series, $M_1$ and $M_2$ represent the radicals of two diazotized amines of the benzene and naphthalene series capable of being coupled in the para position and R represents an aroyl radical of the benzene series, being dark powders, soluble in water with blue to grey color and dyeing cotton and viscose blue to grey shades of good fastness properties.

2. Substantive polyazo dyestuffs of the general formula

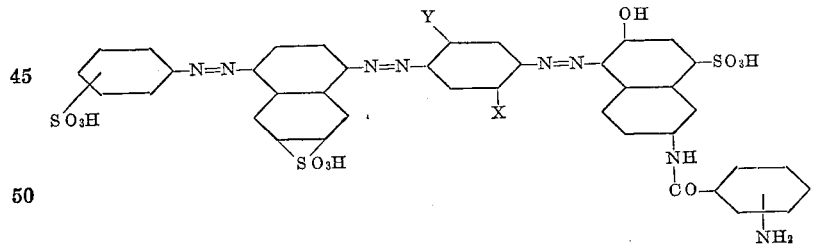

wherein

X represents a member selected from the group consisting of $-O.CH_3$, $-O.C_2H_5$, $-O.CH_2.C_6H_5$ and Y represents a member selected from the group consisting of $-CH_3$, $-O.CH_3$, $O.C_2H_5$, $-O.CH_2.C_6H_5$ being dark powders, soluble in water with blue to grey color and dyeing cotton and viscose blue to grey shades of good fastness properties.

3. A substantive trisazodyestuff of the formula

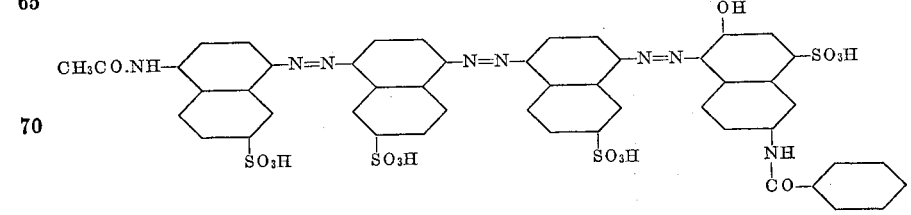

being a dark powder, soluble in water greenish blue, in concentrated sulphuric acid greyish blue and dyeing cotton and regenerated cellulose in fast bluish-grey shades.

4. A substantive trisazodyestuff of the formula

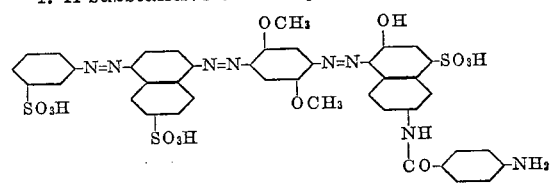

being a dark, bronzing powder, soluble in water greenish-blue, in concentrated sulphuric acid bluish-grey and dyeing cotton and regenerated cellulose in fast bluish-grey shades.

5. A substantive trisazodyestuff of the formula

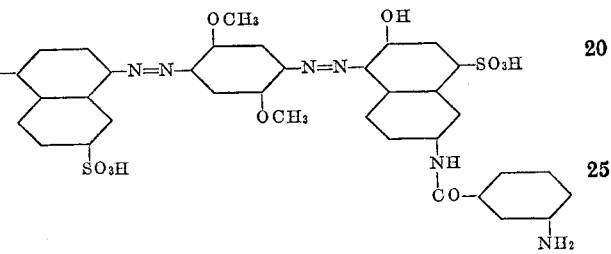

being a dark bronzing powder, soluble in water greenish-blue, in concentrated sulphuric acid bluish-grey and dyeing cotton and regenerated cellulose in fast bluish grey shades.

6. The process of producing substantive polyazo dyestuffs comprising coupling in an alkaline medium a diazotized disazo-dyestuff of the general formula $$A-N=N-M_1-N=N-M_2.-NH_2$$

in which formula

A represents an acid radicle of the benzene and naphthalene series, and $M_1$ and $M_2$ represent two radicals of the benzene and naphthalene series, each bearing the 2 nitrogen atoms linked directly therewith in 1:4—position with a 2-aroylamino-6-hydroxynaphthalene-8-sulphonic acid, the aroyl radicle of which being selected from the group consisting of benzoyl and substituted benzoyl radicals.

ADOLF KREBSER.